(12) United States Patent
Ownby et al.

(10) Patent No.: US 9,943,905 B2
(45) Date of Patent: Apr. 17, 2018

(54) HEAT-EXCHANGING MOLD ASSEMBLIES FOR INFILTRATED DOWNHOLE TOOLS

(71) Applicant: Halliburton Energy Services, Inc., Houston, TX (US)

(72) Inventors: Clayton Arthur Ownby, Houston, TX (US); Grant O. Cook, III, Spring, TX (US); Jeffrey G. Thomas, Magnolia, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 168 days.

(21) Appl. No.: 14/778,675

(22) PCT Filed: Dec. 2, 2014

(86) PCT No.: PCT/US2014/068054
§ 371 (c)(1),
(2) Date: Sep. 21, 2015

(87) PCT Pub. No.: WO2016/089368
PCT Pub. Date: Jun. 9, 2016

(65) Prior Publication Data
US 2016/0325348 A1    Nov. 10, 2016

(51) Int. Cl.
*B22C 9/02* (2006.01)
*B22C 9/10* (2006.01)
(Continued)

(52) U.S. Cl.
CPC .............. *B22D 27/045* (2013.01); *B22C 9/02* (2013.01); *B22C 9/10* (2013.01); *B22C 9/22* (2013.01);
(Continued)

(58) Field of Classification Search
CPC .. B22C 9/02; B22C 9/065; B22C 9/22; B22D 19/06; B22D 19/14
(Continued)

(56) References Cited

U.S. PATENT DOCUMENTS 2,579,898 A * 12/1951 Brucker .................. B29C 33/04
164/338.1
5,275,227 A   1/1994 Staub
(Continued)

FOREIGN PATENT DOCUMENTS

JP        06304736        11/1994

OTHER PUBLICATIONS

International Search Report and Written Opinion for PCT/US2014/068054 dated Aug. 21, 2015.
(Continued)

*Primary Examiner* — Kevin E Yoon
(74) *Attorney, Agent, or Firm* — McDermott Will & Emery LLP

(57) ABSTRACT

An example system for fabricating an infiltrated downhole tool includes a mold assembly having one or more component parts and defining an infiltration chamber to receive and contain matrix reinforcement materials and a binder material used to form the infiltrated downhole tool. One or more thermal conduits are positioned within the one or more component parts for circulating a thermal fluid through at least one of the one or more component parts and thereby placing the thermal fluid in thermal communication with the infiltration chamber.

19 Claims, 8 Drawing Sheets

(51) Int. Cl.
*B22C 9/22* (2006.01)
*B22D 27/04* (2006.01)
*B22F 5/00* (2006.01)
*B22D 19/06* (2006.01)
*B22D 19/14* (2006.01)
*B22D 23/06* (2006.01)
*B22F 7/02* (2006.01)
*B22F 7/06* (2006.01)

(52) U.S. Cl.
CPC ............. *B22D 19/06* (2013.01); *B22D 19/14* (2013.01); *B22D 23/06* (2013.01); *B22F 5/007* (2013.01); *B22F 7/02* (2013.01); *B22F 7/06* (2013.01); *B22F 2203/11* (2013.01); *B22F 2999/00* (2013.01); *Y02P 10/292* (2015.11); *Y02P 10/295* (2015.11)

(58) Field of Classification Search
USPC .................................. 164/97, 98, 338.1, 348
See application file for complete search history.

(56) References Cited

U.S. PATENT DOCUMENTS

| | | | |
|---|---|---|---|
| 6,932,145 B2 | 8/2005 | Frasier et al. | |
| 7,343,960 B1 | 3/2008 | Frasier et al. | |
| 7,377,305 B2 | 5/2008 | Frasier et al. | |
| 7,418,993 B2 | 9/2008 | Frasier et al. | |
| 7,779,890 B2 | 8/2010 | Frasier et al. | |
| 7,824,494 B2 | 11/2010 | Frasier et al. | |
| 8,047,260 B2 | 11/2011 | Uno et al. | |
| 8,082,976 B2 | 12/2011 | Frasier et al. | |
| 8,087,446 B2 | 1/2012 | Frasier et al. | |
| 8,181,692 B2 | 5/2012 | Frasier et al. | |
| 8,272,295 B2 | 9/2012 | Smith et al. | |
| 8,550,144 B2 | 10/2013 | Frasier et al. | |
| 8,720,528 B2 * | 5/2014 | Stephan | B22C 9/06 164/125 |
| 2005/0092457 A1 | 5/2005 | Park | |
| 2008/0028891 A1 | 2/2008 | Calnan et al. | |
| 2010/0212860 A1 | 8/2010 | Rule | |
| 2011/0121475 A1 | 5/2011 | Reese et al. | |
| 2011/0167734 A1 | 7/2011 | Jiang et al. | |
| 2013/0220572 A1 | 8/2013 | Rocco et al. | |
| 2013/0313403 A1 | 11/2013 | Atkins et al. | |
| 2013/0333950 A1 | 12/2013 | Atkins et al. | |

OTHER PUBLICATIONS

International Preliminary Report on Patentability from International Patent Application No. PCT/US2014/068054, dated Jun. 15, 2017.

* cited by examiner

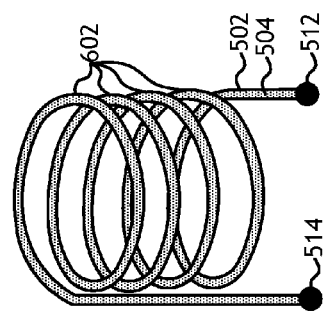
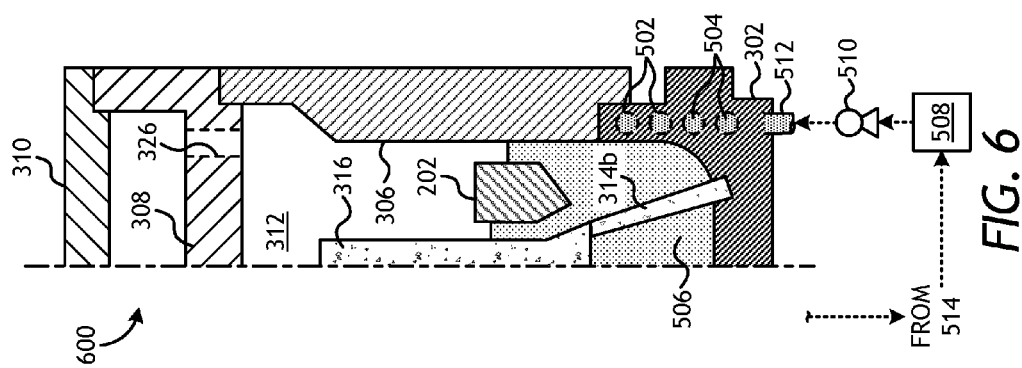
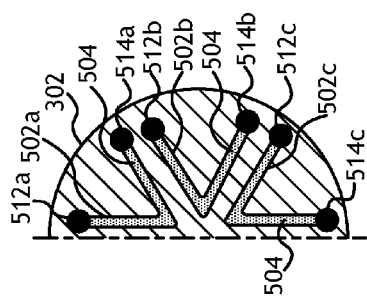
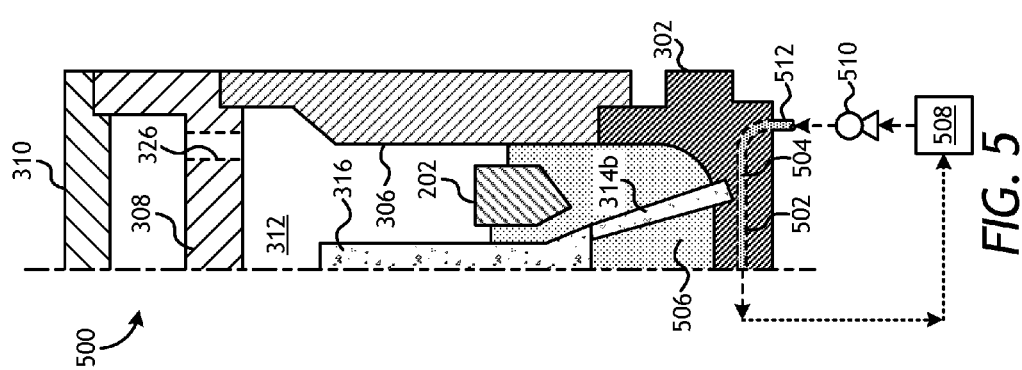

HEAT-EXCHANGING MOLD ASSEMBLIES FOR INFILTRATED DOWNHOLE TOOLS

BACKGROUND

A variety of downhole tools are commonly used in the exploration and production of hydrocarbons. Examples of such downhole tools include cutting tools, such as drill bits, reamers, stabilizers, and coring bits; drilling tools, such as rotary steerable devices and mud motors; and other downhole tools, such as window mills, packers, tool joints, and other wear-prone tools. Rotary drill bits are often used to drill wellbores. One type of rotary drill bit is a fixed-cutter drill bit that has a bit body comprising matrix and reinforcement materials, i.e., a "matrix drill bit" as referred to herein. Matrix drill bits usually include cutting elements or inserts positioned at selected locations on the exterior of the matrix bit body. Fluid flow passageways are formed within the matrix bit body to allow communication of drilling fluids from associated surface drilling equipment through a drill string or drill pipe attached to the matrix bit body.

Matrix drill bits are typically manufactured by placing powder material into a mold and infiltrating the powder material with a binder material, such as a metallic alloy. The various features of the resulting matrix drill bit, such as blades, cutter pockets, and/or fluid-flow passageways, may be provided by shaping the mold cavity and/or by positioning temporary displacement materials within interior portions of the mold cavity. A preformed bit blank (or mandrel) may be placed within the mold cavity to provide reinforcement for the matrix bit body and to allow attachment of the resulting matrix drill bit with a drill string. A quantity of matrix reinforcement material (typically in powder form) may then be placed within the mold cavity with a quantity of the binder material.

The mold is then placed within a furnace and the temperature of the mold is increased to a desired temperature to allow the binder (e.g., metallic alloy) to liquefy and infiltrate the matrix reinforcement material. The furnace typically maintains this desired temperature to the point that the infiltration process is deemed complete, such as when a specific location in the bit reaches a certain temperature. Once the designated process time or temperature has been reached, the mold containing the infiltrated matrix bit is removed from the furnace. As the mold is removed from the furnace, the mold begins to rapidly lose heat to its surrounding environment via heat transfer, such as radiation and/or convection in all directions.

This heat loss continues to a large extent until the mold is moved and placed on a cooling plate and an insulation enclosure or "hot hat" is lowered around the mold. The insulation enclosure drastically reduces the rate of heat loss from the top and sides of the mold while heat is drawn from the bottom of the mold through the cooling plate. This controlled cooling of the mold and the infiltrated matrix bit contained therein can facilitate axial solidification dominating radial solidification, which is loosely termed directional solidification.

As the molten material of the infiltrated matrix bit cools, there is a tendency for shrinkage that could result in voids forming within the bit body unless the molten material is able to continuously backfill such voids. In some cases, for instance, one or more intermediate regions within the bit body may solidify prior to adjacent regions and thereby stop the flow of molten material to locations where shrinkage porosity is developing. In other cases, shrinkage porosity may result in poor metallurgical bonding at the interface between the bit blank and the molten materials, which can result in the formation of cracks within the bit body that can be difficult or impossible to inspect. When such bonding defects are present and/or detected, the drill bit is often scrapped during or following manufacturing assuming they cannot be remedied. Every effort is made to detect these defects and reject any defective drill bit components during manufacturing to help ensure that the drill bits used in a job at a well site will not prematurely fail and to minimize any risk of possible damage to the well.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 5 is a partial cross-sectional side view of an exemplary mold assembly.

FIGS. 5A and 5B are partial cross-sectional top views of the mold of FIG. 5.

FIG. 6 is a partial cross-sectional side view of another exemplary mold assembly.

FIGS. 9A-9D are schematic illustrations of exemplary mating interfaces used to extend a thermal conduit across component parts of a given mold assembly.

DETAILED DESCRIPTION

The present disclosure relates to tool manufacturing and, more particularly, to heat-exchanging mold assembly configurations that promote directional solidification of infiltrated downhole tools.

Figure 1:
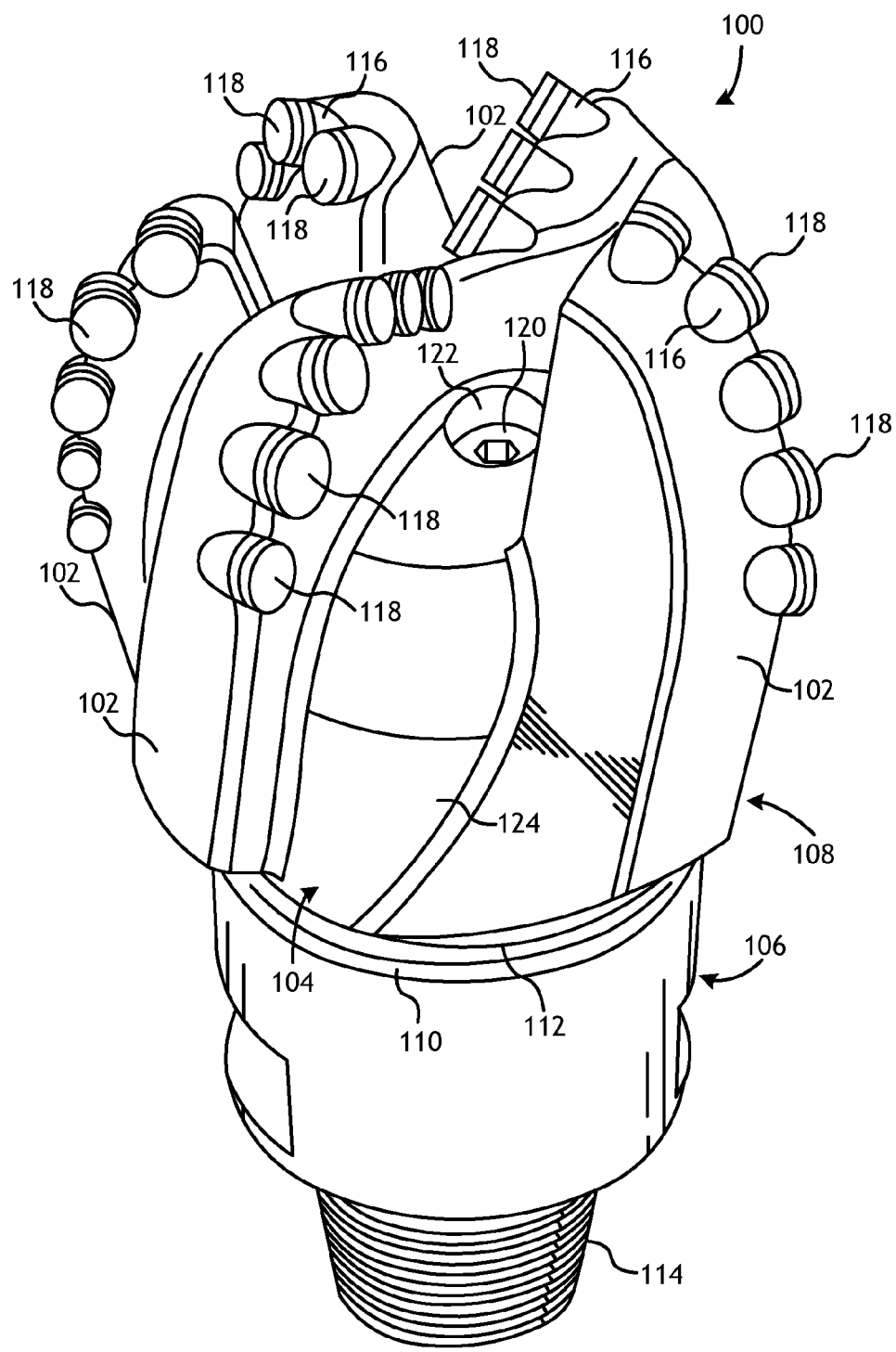
FIG. 1 is a perspective view of an exemplary fixed-cutter drill bit that may be fabricated in accordance with the principles of the present disclosure.

The embodiments described herein improve directional solidification of infiltrated downhole tools by introducing thermal conduits into one or more component parts of a given mold assembly. The thermal conduits may circulate a thermal fluid through the component parts and thereby place the thermal fluid in thermal communication with contents disposed within the mold assembly. The presently disclosed embodiments may prove advantageous in helping improve melting and solidification by introducing an alternate design to standard heating and cooling components commonly used during the infiltration and quenching processes of infiltrated downhole tools. As a result, a more controlled fabrication process is achieved that provides desired thermal profiles for the infiltrated downhole tools. As will be appreciated, controlled cooling and, therefore, solidification of the infiltrated downhole tool, may prove advantageous in preventing or otherwise mitigating the occurrence of some defects that commonly occur in infiltrated downhole tools, such as blank bond-line and nozzle cracking. Among other things, this may improve quality and reduce the rejection rate of drill bit components due to defects during manufacturing FIG. 1 illustrates a perspective view of an example fixed-cutter drill bit 100 that may be fabricated in accordance with the principles of the present disclosure. It should be noted that, while FIG. 1 depicts a fixed-cutter drill bit 100, the principles of the present disclosure are equally applicable to any type of downhole tool that may be formed or otherwise manufactured through an infiltration process. For example, suitable infiltrated downhole tools that may be manufactured in accordance with the present disclosure include, but are not limited to, oilfield drill bits or cutting tools (e.g., fixed-angle drill bits, roller-cone drill bits, coring drill bits, bi-center drill bits, impregnated drill bits, reamers, stabilizers, hole openers, cutters, cutting elements), non-retrievable drilling components, aluminum drill bit bodies associated with casing drilling of wellbores, drill-string stabilizers, cones for roller-cone drill bits, models for forging dies used to fabricate support arms for roller-cone drill bits, arms for fixed reamers, arms for expandable reamers, internal components associated with expandable reamers, sleeves attached to an uphole end of a rotary drill bit, rotary steering tools, logging-while-drilling tools, measurement-while-drilling tools, side-wall coring tools, fishing spears, washover tools, rotors, stators and/or housings for downhole drilling motors, blades and housings for downhole turbines, and other downhole tools having complex configurations and/or asymmetric geometries associated with forming a wellbore.

As illustrated in FIG. 1, the fixed-cutter drill bit 100 (hereafter "the drill bit 100") may include or otherwise define a plurality of cutter blades 102 arranged along the circumference of a bit head 104. The bit head 104 is connected to a shank 106 to form a bit body 108. The shank 106 may be connected to the bit head 104 by welding, such as using laser arc welding that results in the formation of a weld 110 around a weld groove 112. The shank 106 may further include or otherwise be connected to a threaded pin 114, such as an American Petroleum Institute (API) drill pipe thread.

In the depicted example, the drill bit 100 includes five cutter blades 102, in which multiple recesses or pockets 116 are formed. Cutting elements 118 may be fixedly installed within each recess 116. This can be done, for example, by brazing each cutting element 118 into a corresponding recess 116. As the drill bit 100 is rotated in use, the cutting elements 118 engage the rock and underlying earthen materials, to dig, scrape or grind away the material of the formation being penetrated.

During drilling operations, drilling fluid or "mud" can be pumped downhole through a drill string (not shown) coupled to the drill bit 100 at the threaded pin 114. The drilling fluid circulates through and out of the drill bit 100 at one or more nozzles 120 positioned in nozzle openings 122 defined in the bit head 104. Junk slots 124 are formed between each adjacent pair of cutter blades 102. Cuttings, downhole debris, formation fluids, drilling fluid, etc., may pass through the junk slots 124 and circulate back to the well surface within an annulus formed between exterior portions of the drill string and the inner wall of the wellbore being drilled.

Figure 2:
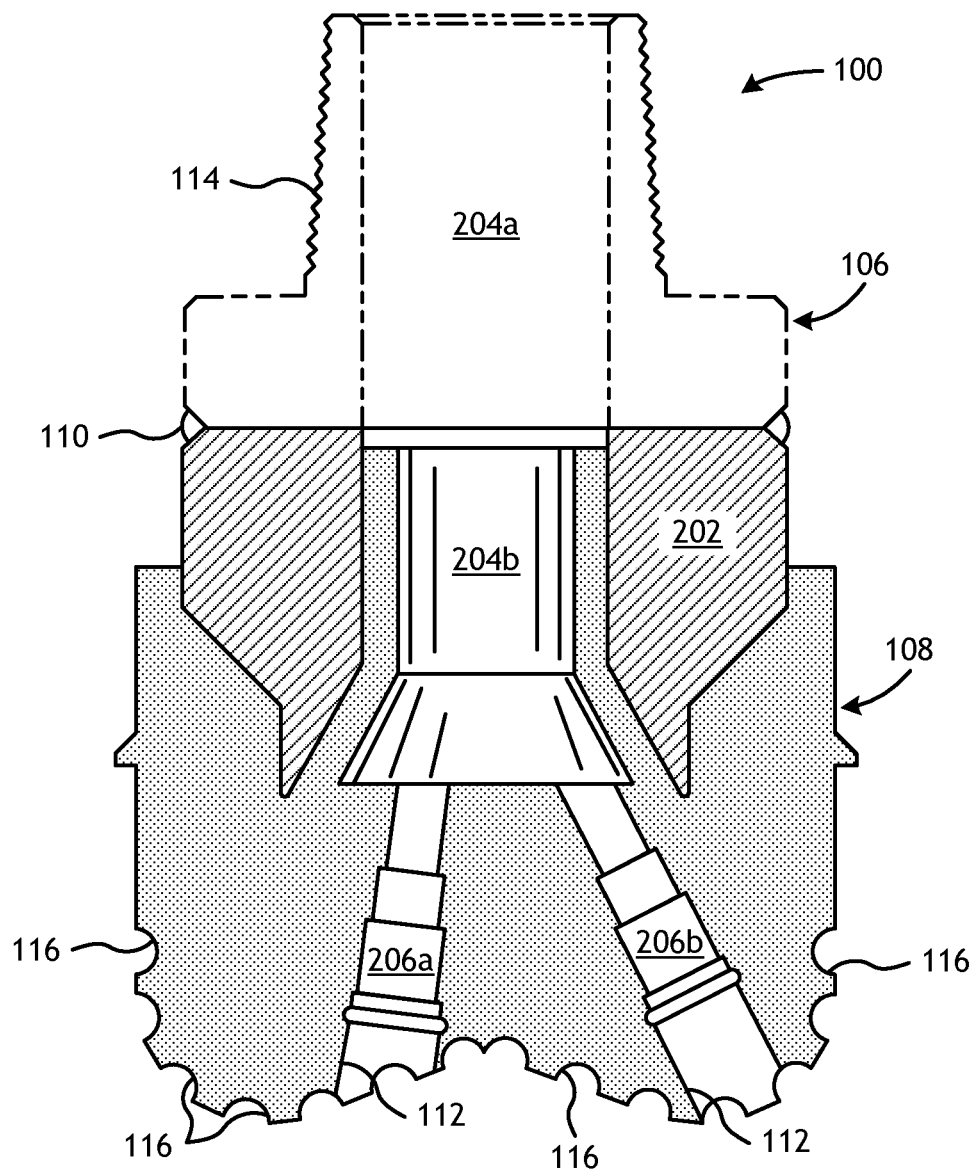
FIG. 2 is a cross-sectional view of the drill bit of FIG. 1.

FIG. 2 is a cross-sectional side view of the drill bit 100 of FIG. 1. Similar numerals from FIG. 1 that are used in FIG. 2 refer to similar components that are not described again. As illustrated, the shank 106 may be securely attached to a metal mandrel 202 at the weld 110 and the metal mandrel 202 extends into the bit body 108. The shank 106 and the metal mandrel 202 are generally cylindrical structures that define corresponding fluid cavities 204a and 204b, respectively, in fluid communication with each other. The fluid cavity 204b of the metal mandrel 202 may further extend longitudinally into the bit body 108. At least one flow passageway (shown as two flow passageways 206a and 206b) may extend from the fluid cavity 204b to exterior portions of the bit body 108. The nozzle openings 122 may be defined at the ends of the fluid flow passageways 206a and 206b at the exterior portions of the bit body 108. The pockets 116 are formed in the bit body 108 and are shaped or otherwise configured to receive the cutting elements 118 (FIG. 1).

Figure 3:
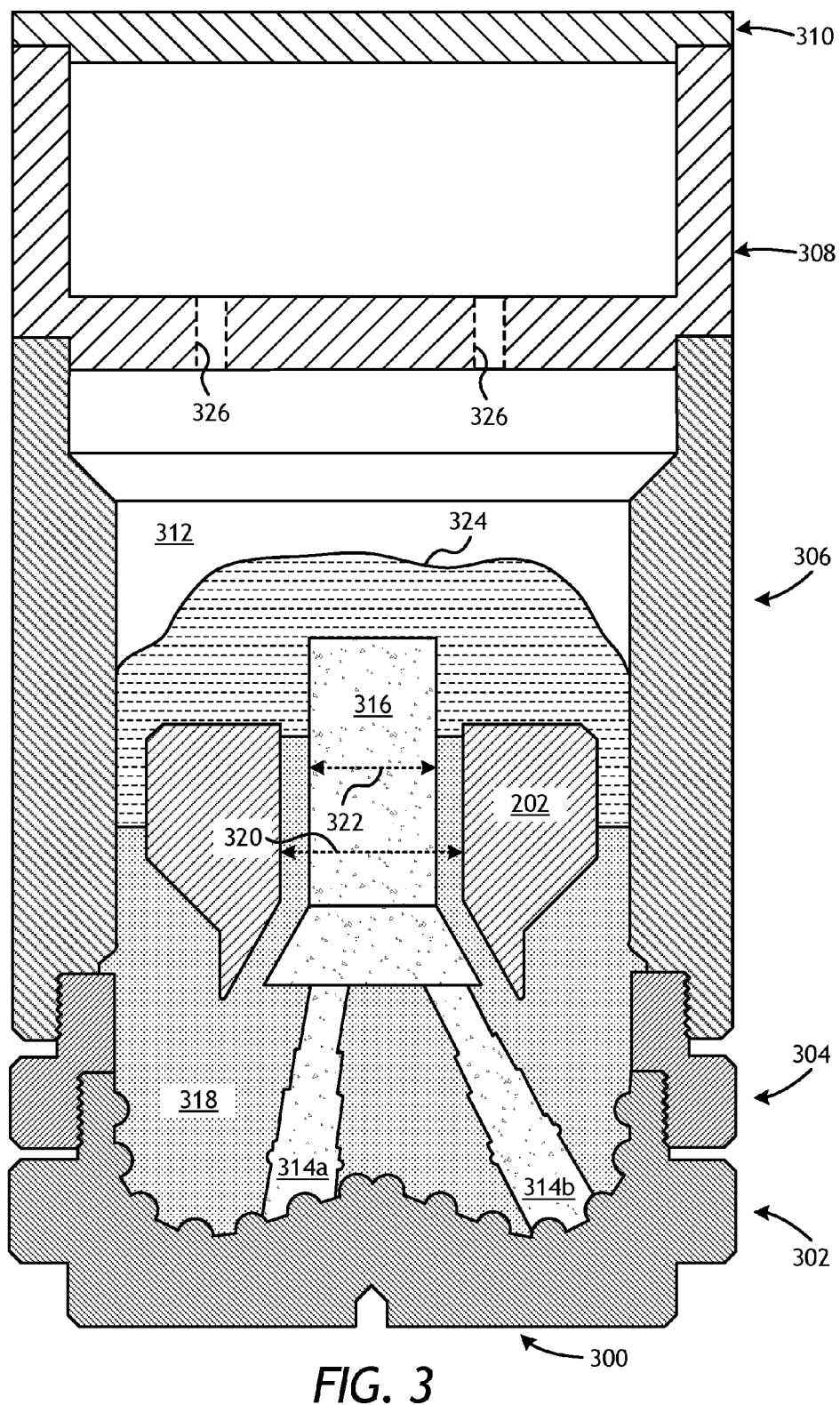
FIG. 3 is a cross-sectional side view of an exemplary mold assembly for use in forming the drill bit of FIG. 1.

FIG. 3 is a cross-sectional side view of a mold assembly 300 that may be used to form the drill bit 100 of FIGS. 1 and 2. While the mold assembly 300 is shown and discussed as being used to help fabricate the drill bit 100, those skilled in the art will readily appreciate that mold assembly 300 and its several variations described herein may be used to help fabricate any of the infiltrated downhole tools mentioned above, without departing from the scope of the disclosure. As illustrated, the mold assembly 300 may include several components such as a mold 302, a gauge ring 304, and a funnel 306. In some embodiments, the funnel 306 may be operatively coupled to the mold 302 via the gauge ring 304, such as by corresponding threaded engagements, as illustrated. In other embodiments, the gauge ring 304 may be omitted from the mold assembly 300 and the funnel 306 may be instead be operatively coupled directly to the mold 302, such as via a corresponding threaded engagement, without departing from the scope of the disclosure.

In some embodiments, as illustrated, the mold assembly 300 may further include a binder bowl 308 and a cap 310 placed above the funnel 306. The mold 302, the gauge ring 304, the funnel 306, the binder bowl 308, and the cap 310 may each be made of or otherwise comprise graphite or alumina ($Al_2O_3$), for example, or other suitable materials. An infiltration chamber 312 may be defined or otherwise provided within the mold assembly 300. Various techniques may be used to manufacture the mold assembly 300 and its components including, but not limited to, machining graphite blanks to produce the various components and thereby define the infiltration chamber 312 to exhibit a negative or reverse profile of desired exterior features of the drill bit 100 (FIGS. 1 and 2).

Materials, such as consolidated sand or graphite, may be positioned within the mold assembly 300 at desired locations to form various features of the drill bit 100 (FIGS. 1 and 2). For example, nozzle displacement legs 314a and 314b may be positioned to correspond with desired locations and configurations of the fluid flow passageways 206a,b (FIG. 2) and their respective nozzle openings 122 (FIGS. 1 and 2). Moreover, a cylindrically-shaped consolidated displacement core 316 may be placed on the legs 314a,b. The number of legs 314a,b extending from the displacement core 316 will depend upon the desired number of flow passageways and corresponding nozzle openings 122 in the drill bit 100.

After the desired materials, including the displacement core 316 and the nozzle displacement legs 314a,b, have been installed within the mold assembly 300, matrix reinforcement materials 318 may then be placed within or otherwise introduced into the mold assembly 300. For some applications, two or more different types of matrix reinforcement materials 318 may be deposited in the mold assembly 300. Suitable matrix reinforcement materials 318 include, but are not limited to, tungsten carbide, monotungsten carbide (WC), ditungsten carbide ($W_2C$), macrocrystalline tungsten carbide, other metal carbides, metal borides, metal oxides, metal nitrides, natural and synthetic diamond, and polycrystalline diamond (PCD). Examples of other metal carbides may include, but are not limited to, titanium carbide and tantalum carbide, and various mixtures of such materials may also be used.

The metal mandrel 202 may be supported at least partially by the matrix reinforcement materials 318 within the infiltration chamber 312. More particularly, after a sufficient volume of the matrix reinforcement materials 318 has been added to the mold assembly 300, the metal mandrel 202 may then be placed within mold assembly 300 and concentrically-arranged about the displacement core 316. The metal mandrel 202 may include an inside diameter 320 that is greater than an outside diameter 322 of the displacement core 316, and various fixtures (not expressly shown) may be used to position the metal mandrel 202 within the mold assembly 300 at a desired location. The matrix reinforcement materials 318 may then be filled to a desired level within the infiltration chamber 312.

Binder material 324 may then be placed on top of the matrix reinforcement materials 318, the metal mandrel 202, and the core 316. Various types of binder materials 324 may be used and include, but are not limited to, metallic alloys of copper (Cu), nickel (Ni), manganese (Mn), lead (Pb), tin (Sn), cobalt (Co) and silver (Ag). Phosphorous (P) may sometimes also be added in small quantities to reduce the melting temperature range of infiltration materials positioned in the mold assembly 300. Various mixtures of such metallic alloys may also be used as the binder material 324. In some embodiments, the binder material 324 may be covered with a flux layer (not expressly shown). The amount of binder material 324 and optional flux material added to the infiltration chamber 312 should be at least enough to infiltrate the matrix reinforcement materials 318 during the infiltration process. In some instances, some or all of the binder material 324 may be placed in the binder bowl 308, which may be used to distribute the binder material 324 into the infiltration chamber 312 via various conduits 326 that extend therethrough. The cap 310 (if used) may then be placed over the mold assembly 300, thereby readying the mold assembly 300 for heating.

Figure 4A:
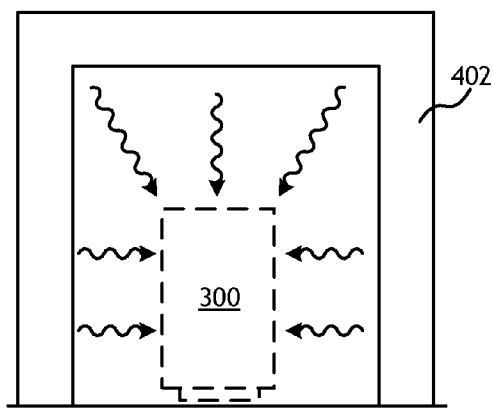
FIGS. 4A-4C are progressive schematic diagrams of an exemplary method of fabricating a drill bit.
Figure 4B:
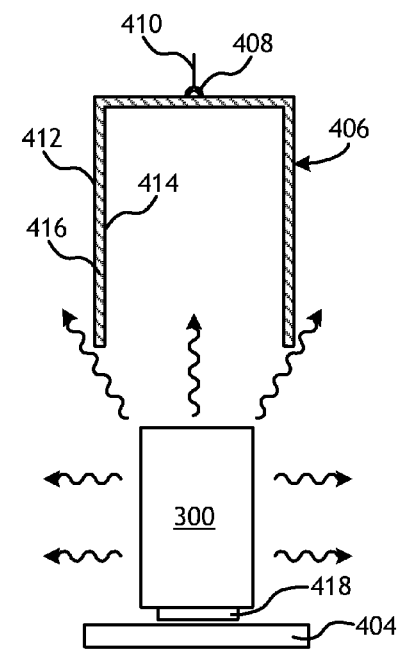
Figure 4C:
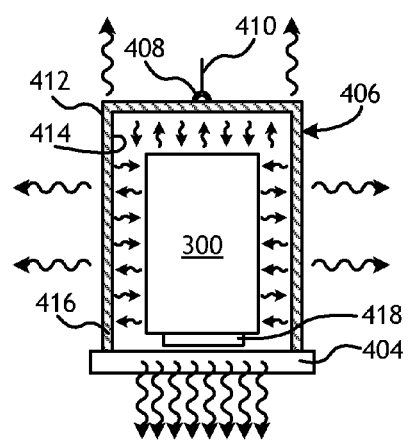

Referring now to FIGS. 4A-4C, with continued reference to FIG. 3, illustrated are schematic diagrams that sequentially illustrate an example method of heating and cooling the mold assembly 300 of FIG. 3, in accordance with the principles of the present disclosure. In FIG. 4A, the mold assembly 300 is depicted as being positioned within a furnace 402. The temperature of the mold assembly 300 and its contents are elevated within the furnace 402 until the binder material 324 liquefies and is able to infiltrate the matrix reinforcement materials 318. Once a specific location in the mold assembly 300 reaches a certain temperature in the furnace 402, or the mold assembly 300 is otherwise maintained at a particular temperature for a predetermined amount of time, the mold assembly 300 is then removed from the furnace 402 and immediately begins to lose heat by radiating thermal energy to its surroundings while heat is also convected away by cooler air outside the furnace 402. In some cases, as depicted in FIG. 4B, the mold assembly 300 may be transported to and set down upon a thermal heat sink 404.

The radiative and convective heat losses from the mold assembly 300 to the environment continue until an insulation enclosure 406 is lowered around the mold assembly 300. The insulation enclosure 406 may be a rigid shell or structure used to insulate the mold assembly 300 and thereby slow the cooling process. In some cases, the insulation enclosure 406 may include a hook 408 attached to a top surface thereof. The hook 408 may provide an attachment location, such as for a lifting member, whereby the insulation enclosure 406 may be grasped and/or otherwise attached to for transport. For instance, a chain or wire 410 may be coupled to the hook 408 to lift and move the insulation enclosure 406, as illustrated. In other cases, a mandrel or other type of manipulator (not shown) may grasp onto the hook 408 to move the insulation enclosure 406 to a desired location.

The insulation enclosure 406 may include an outer frame 412, an inner frame 414, and insulation material 416 arranged between the outer and inner frames 412, 414. In some embodiments, both the outer frame 412 and the inner frame 414 may be made of rolled steel and shaped (i.e., bent, welded, etc.) into the general shape, design, and/or configuration of the insulation enclosure 406. In other embodiments, the inner frame 414 may be a metal wire mesh that holds the insulation material 416 between the outer frame 412 and the inner frame 414. The insulation material 416 may be selected from a variety of insulative materials, such as those discussed below. In at least one embodiment, the insulation material 416 may be a ceramic fiber blanket, such as INSWOOL® or the like.

As depicted in FIG. 4C, the insulation enclosure 406 may enclose the mold assembly 300 such that thermal energy radiating from the mold assembly 300 is dramatically reduced from the top and sides of the mold assembly 300 and is instead directed substantially downward and otherwise toward/into the thermal heat sink 404 or back towards the mold assembly 300. In the illustrated embodiment, the thermal heat sink 404 is a cooling plate designed to circulate a fluid (e.g., water) at a reduced temperature relative to the mold assembly 300 (i.e., at or near ambient) to draw thermal energy from the mold assembly 300 and into the circulating fluid, and thereby reduce the temperature of the mold assembly 300. In other embodiments, however, the thermal heat sink 404 may be any type of cooling device or heat exchanger configured to encourage heat transfer from the bottom 418 of the mold assembly 300 to the thermal heat sink 404. In yet other embodiments, the thermal heat sink 404 may be any stable or rigid surface that may support the mold assembly 300, and preferably having a high thermal capacity, such as a concrete slab or flooring.

Once the insulation enclosure 406 is positioned over the mold assembly 300 and the thermal heat sink 404 is operational, the majority of the thermal energy is transferred away from the mold assembly 300 through the bottom 418 of the mold assembly 300 and into the thermal heat sink 404. This controlled cooling of the mold assembly 300 and its contents allows an operator or an automated control system to regulate or control the thermal profile of the mold assembly 300 to a certain extent and may result in directional solidification of the molten contents within the mold assembly 300, where axial solidification of the molten contents dominates radial solidification. Within the mold assembly 300, the face of the drill bit (i.e., the end of the drill bit that includes the cutters) may be positioned at the bottom 418 of the mold assembly 300 and otherwise adjacent the thermal heat sink 404 while the shank 106 (FIG. 1) may be positioned adjacent the top of the mold assembly 300. As a result, the drill bit 100 (FIGS. 1 and 2) may be cooled axially upward, from the cutters 118 (FIG. 1) toward the shank 106 (FIG. 1).

Such directional solidification (from the bottom up) may prove advantageous in reducing the occurrence of voids due to shrinkage porosity, cracks at the interface between the metal mandrel 202 and the molten materials within the infiltration chamber 312, and nozzle cracks. However, the insulating capability of the insulation enclosure 406 may require augmentation to produce a sufficient amount of directional cooling. According to embodiments of the present disclosure, as an alternative or in addition to using the insulation enclosure 406, mold assemblies for an infiltrated downhole tool may be modified to help influence the overall thermal profile of the infiltrated downhole tool (e.g., the drill bit 100 of FIGS. 1 and 2) and facilitate a sufficient amount of directional cooling. More particularly, embodiments of the present disclosure provide heat-exchanging mold assembly designs that allow an operator (or an automated control system) to selectively and actively heat various portions of a given mold assembly and thereby improve directional solidification of an infiltrated downhole tool. As described in more detail below, the heat-exchanging capability may be applied to one or all of the component parts of the given mold assembly.

Referring now to FIG. 5, illustrated is a partial cross-sectional side view of an exemplary mold assembly 500, according to one or more embodiments. The mold assembly 500 may be similar in some respects to the mold assembly 300 of FIG. 3 and therefore may be best understood with reference thereto, where like numerals represent like elements or components not described again. The mold assembly 500 may include some or all of the component parts of the mold assembly 300 of FIG. 3. For instance, as illustrated, the mold assembly 500 may include some or all of the mold 302, the funnel 306, the binder bowl 308, and the cap 310. In some embodiments, while not shown in FIG. 5, the gauge ring 304 (FIG. 3) may also be included in the mold assembly 500. The mold assembly 500 may further include the metal mandrel 202, the displacement core 316, and one or more nozzle displacement legs 314b (one shown), as generally described above.

Some or all of the foregoing components of the mold assembly 500 are collectively referred to herein as the "component parts" of the mold assembly 500. Accordingly, each of the mold 302, the gauge ring 304 (FIG. 3), the funnel 306, the binder bowl 308, the cap 310, the displacement core 316, and the nozzle displacement legs 314a,b may be considered component parts of the mold assembly 500 and also component parts of any of the other mold assemblies described herein.

As illustrated, one or more thermal conduits 502 may be positioned within one or more of the component parts of the mold assembly 500. In the illustrated embodiment, the thermal conduit(s) 502 are depicted as being positioned within the mold 302, for example, but could equally be positioned within any of the component parts, as described in further detail below. As used herein, the term "positioned within" can refer to physically embedding the thermal conduits 502 within a component part of a given mold assembly, but may also refer to the thermal conduits 502 forming an integral part of a component part, such as by defining the thermal conduit 502 directly in the material of the given component part via a machining and/or assembling process. In yet other embodiments, as described in more detail below, the thermal conduits 502 may be positioned within a given component part of a given mold assembly by being arranged within a fluid flow passage or cavity defined within the given component part of the given mold assembly.

The thermal conduits 502 may be configured to circulate a thermal fluid 504 through portions of the mold assembly 500 and thereby place the thermal fluid 504 in thermal communication with contents 506 disposed within the infiltration chamber 312. As used herein, the term "thermal communication" refers to the ability to exchange thermal energy between the thermal fluid 504 and the infiltration chamber 312 and/or its contents 506. In some embodiments, for instance, thermal energy may be imparted and/or transferred to the infiltration chamber 312 (or the contents 506 thereof) from the thermal fluid 504. In other embodiments, however, the thermal fluid 504 may be configured to extract thermal energy from the infiltration chamber 312 (or its contents 506). Accordingly, circulating the thermal fluid 504 through the thermal conduits 502 may allow an operator (or an automated control system) to selectively alter the thermal profile of the contents 506 within the infiltration chamber 312.

In at least one embodiment, the contents 506 within the infiltration chamber 312 may comprise the individual or separated portions of the matrix reinforcement materials 318 (FIG. 3) and the binder material 324 (FIG. 3). In such embodiments, the thermal fluid 504 may actively and/or selectively provide thermal energy to the matrix reinforcement materials 318 and the binder material 324 to help facilitate the infiltration process. Moreover, in such embodiments, the furnace 402 of FIG. 4A may be omitted or otherwise supported through circulation of the thermal fluid 504 through component parts of the mold assembly 500. In other embodiments, however, the contents 506 within the infiltration chamber 312 may be a molten mass following the infiltration process in the furnace 402, and the thermal fluid 504 may be configured to regulate thermal energy transfer out of the molten mass, and thereby help directional solidification as it cools.

The thermal fluid 504 may be any fluidic substance that exhibits suitable properties, such as high thermal conductivity, high thermal diffusivity, high density, low viscosity (kinematic or dynamic), high specific heat, and high boiling point and low vapor pressure for liquids, to enable the thermal fluid 504 to exchange thermal energy with the contents 506 in the infiltration chamber 312. Suitable fluids 504 that may be used include, but are not limited to, a gas (e.g., air, carbon dioxide, argon, helium, oxygen, nitrogen), water, steam, an oil, a coolant (e.g., glycols), a molten metal, a molten metal alloy, a fluidized bed, or a molten salt. Suitable molten metals or metal alloys used for the thermal fluid 504 may include Pb, Bi, Pb—Bi, K, Na, Na—K, Ga, In, Sn, Li, Zn, or any alloys thereof. Suitable molten salts used for the thermal fluid 504 include alkali fluoride salts (e.g., LiF—KF, LiF—NaF—KF, LiF—RbF, LiF—NaF—RbF), $BeF_2$ salts (e.g., LiF—$BeF_2$, NaF—$BeF_2$, LiF—NaF—$BeF_2$), $ZrF_4$ salts (e.g., KF—$ZrF_4$, NaF—$ZrF_4$, NaF—KF—$ZrF_4$, LiF—$ZrF_4$, LiF—NaF—$ZrF_4$, RbF—$ZrF_4$), chloride-based salts (e.g., LiCl—KCl, LiCl—RbCl, KCl—$MgCl_2$, NaCl—$MgCl_2$, LiCl—KCl—$MgCl_2$, KCl—NaCl—$MgCl_2$), fluoroborate-based salts (e.g., NaF—$NaBF_4$, KF—$KBF_4$, RbF—$RbBF_4$), or nitrate-based salts (e.g., $NaNO_3$—$KNO_3$, $Ca(NO_3)_2$—$NaNO_3$—$KNO_3$, $LiNO_3$—$NaNO_3$—$KNO_3$), and any alloys thereof.

The thermal conduits 502 may each be in fluid communication with a heat exchanger 508 configured to thermally condition the thermal fluid 504. As used herein, the term "thermally condition" refers to heating or cooling the thermal fluid 504. Whether the heat exchanger 508 thermally conditions the thermal fluid 504 by heating or cooling will depend on the application. The heat exchanger 508 may include a pump 510 operable to circulate the thermal fluid 504 through the thermal conduits 502 and back to the heat exchanger 508 for continuous thermal conditioning of the thermal fluid 504. As will be appreciated, being able to selectively and actively adjust and otherwise optimize the level of directional heat imparted by the thermal fluid 504 may prove advantageous in being able to vary the thermal profile within the infiltration chamber 312. It should be noted that while the pump 510 is depicted as following the heat exchanger 508 in the fluid circuit, the pump 510 might equally precede the heat exchanger 508, without departing from the scope of the disclosure.

The heat exchanger 508 may comprise any type of heat exchanging apparatus capable of maintaining the thermal fluid 504 at a predetermined or preselected temperature for circulation through the thermal conduit(s) 502. Suitable heat exchangers 508 may include, but are not limited to, a heating element, a radiant heater, an electric heater, an infrared heater, an induction heater, one or more induction coils, a heating band, one or more heated coils, or any combination thereof. Suitable configurations for a heating element may include, but are not be limited to, coils, tubes, bundled tubes, concentric tubes, plates, corrugated plates, strips, shells, baffles, channels, micro-channels, finned coils, finned plates, finned strips, louvered fins, wavy fins, pin fins, and the like, or any combination thereof.

In the mold assembly 500, the thermal conduit 502 enters the mold 302 at or near its bottom at an inlet 512. While the inlet 512 is shown as being positioned or located on the underside of the mold 302, it will be appreciated that the inlet 512 may alternatively be positioned at other locations on the mold 302, such as on the side. The inlet 512 places the pump 510 in fluid communication with the thermal conduit 502 to circulate the thermal fluid 504 through the mold 302 via the thermal conduit 502. The mold 302 may also include or otherwise provide an outlet (not shown) for the thermal conduit 502. In some embodiments, and for symmetry purposes, the outlet may be located on the opposite side of the mold 302. In other embodiments, however, the outlet may be located adjacent the inlet 512. Similar to the inlet 512, the outlet may be located on the bottom or the side of the mold 302, without departing from the scope of the disclosure.

The conduit 502 in FIG. 5 may travel horizontally through the mold 302 until exiting the mold 302 at the outlet (not shown). The conduit 502 may also vary in vertical heights as it traverses within the mold 302. For example, the conduit 502 may track the inner surface contour of the mold 302, such that it is positioned higher at outer radial locations and lower at inner radial locations. In other embodiments, however, the thermal conduit(s) 502 positioned within the mold 302 may exhibit various designs and/or configurations. For instance, FIGS. 5A and 5B depict partial cross-sectional top (or bottom) views of the mold 302 showing at least two different configurations of the thermal conduit(s) 502. In FIG. 5A, the thermal conduit 502 is depicted as a single thermal conduit 502 that is spiraled or coiled within the mold. As illustrated, the thermal conduit 502 may include the inlet 512 located adjacent the outer periphery of the mold 302, and an outlet 514 located at or near the center of the mold 302. Furthermore, coiled the conduit 502 illustrated in FIG. 5A may vary in vertical height such that portions of the conduit 502 at inner radial locations are at lower heights than portions of the conduit 502 at outer radial locations, thereby forming a bowl-like shape that generally matches the inner surface contour of the mold 302.

In FIG. 5B, the thermal conduit 502 is depicted as comprising a plurality of thermal conduits 502, shown as thermal conduits 502a, 502b, and 502c. Each thermal conduit 502a-c may be configured to circulate the thermal fluid 504 between an inlet 512, shown as inlets 512a, 512b, and 512c, respectively, and an outlet 514, shown as outlets 514a, 514b, and 514c. The thermal conduits 502a-c each form a generally angled or triangular flow pathway. It will be appreciated, however, that other designs or configurations of the thermal conduits 502a-c may alternatively be employed, without departing from the scope of the disclosure. Moreover, while only three thermal conduits 502a-c are depicted in FIG. 5A (six if the full mold 302 were shown past the centerline), it will be appreciated that more or less than three thermal conduits 502a-c may be employed. As with prior embodiments, the conduits 502a-c illustrated in FIG. 5B may vary in vertical height at selected locations so as to generally match the inner surface contour of the mold 302.

In some embodiments, each thermal conduit 502a-c may be associated with the same fluid circuit, where the pump 510 (FIG. 5) provides the thermal fluid 504 to each inlet 512a-c, and the heat exchanger 508 (FIG. 5) receives the circulated fluid 504 from each outlet 514a-c for thermal conditioning. In other embodiments, however, each thermal conduit 502a-c may be fluidly coupled to separate and discrete heat exchangers 508 and associated pumps 510. In such embodiments, an operator (or an automated control system) may be able to selectively and actively vary the temperature of the thermal fluid 504 in each thermal conduit 502a-c and thereby selectively alter the thermal profile of the mold assembly 500 at the locations of the individual thermal conduits 502a-c and thereby produce a desired heat gradient across the mold 302. Moreover, in such embodiments, the thermal fluid 504 in each fluid circuit may be the same type or a different type of fluid. In yet other embodiments, two or more of the thermal conduits 502a-c may be grouped together and placed in fluid communication with a common heat exchanger 508 and associated pump 510 independent of the other thermal conduits 502a-c.

In any of the aforementioned embodiments, actuated baffle-like members may be incorporated in one or more of the thermal conduits 502a-c to restrict or expand flow within each thermal conduit 502a-c to thereby modulate imposed heat gradients using a minimum number of heat exchangers 508 and/or pumps 510. As an example, alternating thermal conduits 502 may be coupled to two distinct groups (e.g., via the use of two heat exchanger 508/pump 510 systems or the use of baffles). In this manner, different heat profiles may be applied via strategically located thermal conduits 502 to the bit blades 102 (FIG. 1) and junk slots 124 (FIG. 1), since the junk slots 124 are typically formed using a displacement material that has different thermal properties than those of the bit blade 102. In the case of a four-bladed bit, the mold 302 would be configured with eight thermal conduits 502 (perhaps similar to those shown in FIG. 5B), where a first group of four conduits 502 may be located below each bit blade 102 and a second group of four conduits 502 may be located below each junk slot 124 and, therefore, between the thermal conduits 502 of the first group.

Referring now to FIG. 6, with continued reference to FIG. 5, illustrated is a partial cross-sectional side view of another exemplary mold assembly 600, according to one or more embodiments. The mold assembly 600 may be similar in some respects to the mold assembly 500 of FIG. 5 and therefore may be best understood with reference thereto, where like numerals represent like elements or components not described again. Similar to the mold assembly 500 of FIG. 5, for instance, the mold assembly 600 may include the mold 302, the funnel 306, the binder bowl 308, the cap 310, the metal mandrel 202, the displacement core 316, and one or more nozzle displacement legs 314b (one shown). Moreover, similar to the mold assembly 500, the mold assembly 600 may also include one or more thermal conduits 502 positioned within one or more component parts of the mold assembly 600 and, more particularly, within the mold 302 for circulating the thermal fluid 504.

Unlike the thermal conduit(s) 502 of FIG. 5, however, the thermal conduit(s) 502 in FIG. 6 may form a coil that helically winds within the mold 302 along its height. As best seen in FIG. 6A, the thermal conduit 502 may comprise a helical structure that provides a plurality of loops 602 that allow the thermal fluid 504 to helically circulate along the height of the mold 302 at or near its outer periphery. In some embodiments, as illustrated, the thermal fluid 504 may enter the thermal conduit 502 on the underside of the mold 302 at the inlet 512. In other embodiments, however, the inlet 512 may be positioned at other locations on the mold 302, such as on the side, without departing from the scope of the disclosure. The inlet 512 places the pump 510 in fluid communication with the thermal conduit 502 to circulate the thermal fluid 504 through the helically-winding thermal conduit 502 positioned in the mold 302. An outlet 514 (FIG. 6A) may also be provided on the thermal conduit 502 to recirculate the thermal fluid 504 back to the heat exchanger 508. As will be appreciated, the helical thermal conduit 502 in the mold 302 of FIG. 6 may prove advantageous in enhancing and otherwise regulating the thermal gradient along the axial height of the mold 302.

The thermal conduits 502 in any of the embodiments described herein and positioned within any of the component parts of any of the mold assemblies described herein may exhibit various cross-sectional shapes. While generally depicted in FIGS. 5 and 6 as exhibiting a generally circular cross-sectional shape, the conduits 502 may alternatively exhibit a polygonal (e.g., triangular, square, rectangular, etc.) cross-sectional shape or any other cross-sectional shape capable of facilitating the circulation of the thermal fluid 504, without departing from the scope of the disclosure. It will be appreciated that the various embodiments described and illustrated with respect to FIGS. 5 and 6 may be combined in any combination, in keeping within the scope of this disclosure. Indeed, variations in the placement, number, and operation of any of the thermal conduits 502 of either of the mold assemblies 500, 600 may be implemented in any combination, without departing from the scope of the disclosure. Moreover, as indicated above, any of the conduits 502 may vary in vertical height at selected locations in the mold 302 and also horizontally to provide desired thermal profiles. For example, the conduits 502 may each be equally offset from the internal surfaces of the mold 302 or from the outer surfaces of the mold 302.

Figure 7:
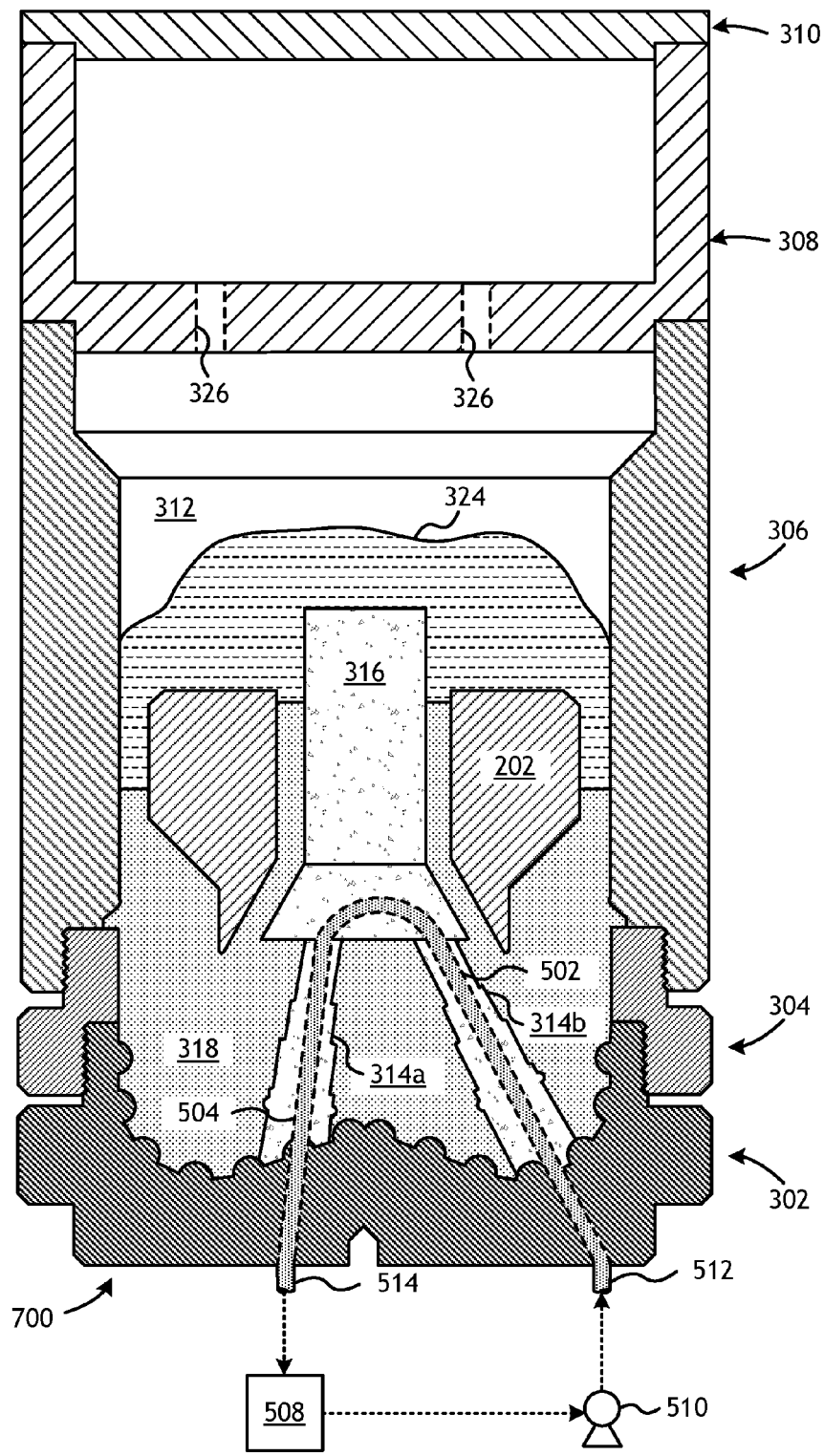
FIG. 7 is a partial cross-sectional view of another exemplary mold assembly.

Referring now to FIG. 7, illustrated is a partial cross-sectional side view of another exemplary mold assembly 700, according to one or more embodiments. The mold assembly 700 may be similar in some respects to the mold assembly 300 of FIG. 3 and the mold assemblies 500 and 600 of FIGS. 5 and 6, respectively, and therefore may be best understood with reference thereto, where like numerals represent like elements or components not described again. Similar to each of the mold assemblies 300, 500, 600, for instance, the mold assembly 700 may include the mold 302, the funnel 306, the binder bowl 308, the cap 310, the metal mandrel 202, the displacement core 316, and the nozzle displacement legs 314a,b. The mold assembly 700 may also include the gauge ring 304 interposing the mold 302 and the funnel 306.

Moreover, similar to the mold assemblies 500 and 600, the mold assembly 700 may also include the one or more thermal conduits 502 positioned within one or more of the component parts of the mold assembly 700. More particularly, the thermal conduit(s) 502 in FIG. 7 may be generally positioned within the nozzle displacement legs 314a and 314b. As illustrated, an inlet 512 may be located on the underside of the mold 302 and the thermal conduit 502 may extend from the inlet 512 and completely penetrate the mold 302 until entering one of the nozzle displacement legs 314b. The thermal conduit 502 may continue through the nozzle displacement leg 314b and extend to the displacement core 316, where it changes course and extends back down through another nozzle displacement leg 314a. At the end of the second nozzle displacement leg 314a, the thermal conduit 502 may again completely penetrate the mold 302 and extend to the outlet 514 also positioned on the underside of the mold 302. The thermal fluid 504 may then circulate through the heat exchanger 508 and be pumped back into the mold assembly 700 at the pump 510.

While only two nozzle displacement legs 314a,b are shown in FIG. 7, it will be appreciated that several more nozzle displacement legs may be employed. In such embodiments, a select number (e.g., half) of nozzle displacement legs might accommodate influx of the thermal fluid 504 while another select number (e.g., the other half) might accommodate efflux of the thermal fluid 504. These two types of thermal conduits 502 (e.g., inlet and outlet thermal conduits) may be arranged in alternating order around the circumference of the mold 302. Furthermore, these thermal conduits 502 may be independent of each other or they may all join in a mixing chamber in the displacement core 316. In such a case, a select number (e.g., one to half) of nozzle displacement legs might accommodate influx of the thermal fluid 504 while another select number (e.g., the remainder) might accommodate efflux of the thermal fluid 504.

Figure 8B:
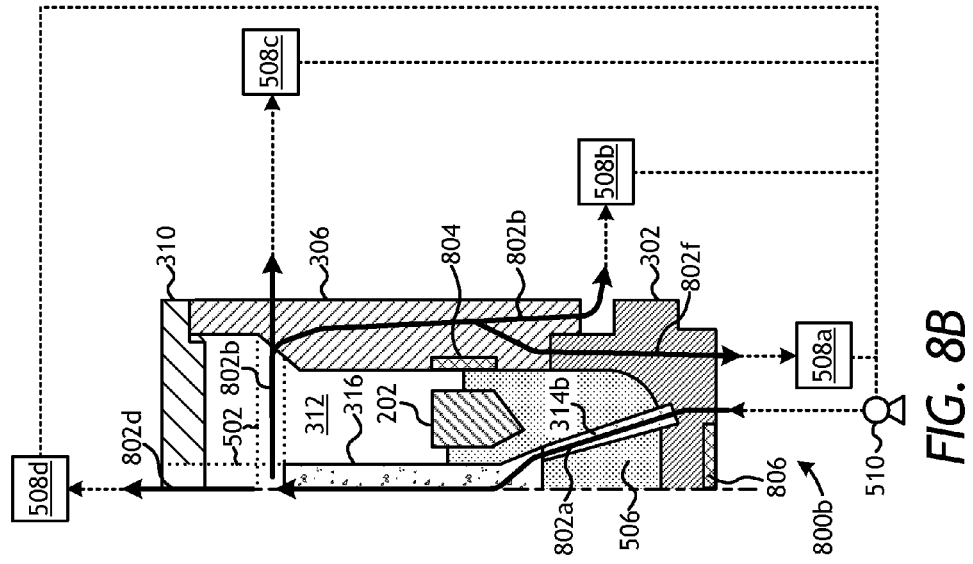
FIGS. 8A and 9B are cross-sectional side views of other exemplary mold assemblies.
Figure 8A:
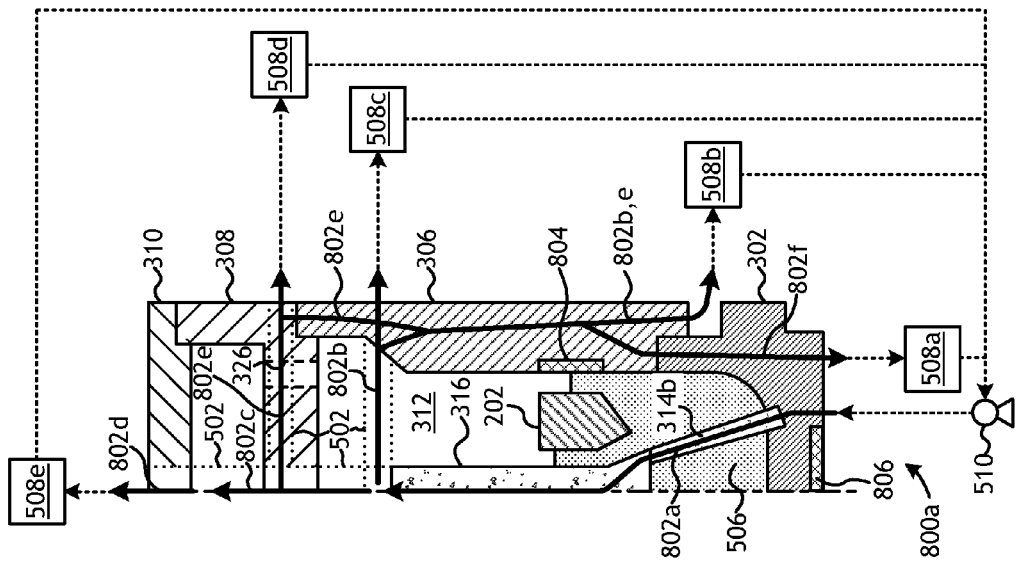

Referring now to FIGS. 8A and 8B, illustrated are partial cross-sectional views of exemplary mold assemblies 800a and 800b, respectively. The mold assemblies 800a,b may be similar in some respects to the other mold assemblies described herein and therefore may be best understood with reference thereto, where like numerals represent like elements or components not described again. For instance, the mold assemblies 800a,b may each include the mold 302, the funnel 306, the cap 310, the metal mandrel 202, the displacement core 316, and one or more nozzle displacement legs 314b (one shown). The first mold assembly 800a may further include the binder bowl 308, and each mold assembly 800a,b may alternatively also include the gauge ring 304 (FIG. 3) that interposes the mold 302 and the funnel 306.

FIGS. 8A and 8B illustrate several flow paths that the thermal conduits 502 described herein may take to circulate the thermal fluid 504 (FIGS. 5, 6, and 7) throughout some or all of the component parts of the mold assemblies 800a,b. Accordingly, each flow path arrow 802 depicted in FIGS. 8A and 8B (shown as flow paths 802a, 802b, 802c, 802d, 802e, and 802f) represent one or more thermal conduits 502 capable of circulating the thermal fluid 504 through the indicated component parts of the mold assemblies 800a,b.

In each of FIGS. 8A and 8B, the thermal fluid 504 may be introduced into the mold assemblies 800a,b via one of the nozzle displacement legs 314b after completely penetrating the mold 302, as shown by the first flow path 802a. As indicated, the first flow path 802a may, in some embodiments, originate from the pump 510. It will be appreciated, however, that the position of the pump 510 and the heat exchanger 508 may be reversed in the fluid circuit, as mentioned above. Accordingly, in other embodiments, the thermal fluid 504 entering the first flow path 802a may alternatively originate from the heat exchanger 508. As indicated in FIGS. 8A and 8B, the heat exchanger 508 is shown as heat exchangers 508a-e, where each heat exchanger 508a-e may be the same or a different heat exchanger 508a-e, without departing from the scope of the disclosure.

After extending through the nozzle displacement leg 314b, the first flow path 802a may extend further into and through the displacement core 316. In some embodiments, the first flow path 802a may terminate at the top of the displacement core 316 and the thermal fluid 504 may be ejected out of the first flow path 802a and into the infiltration chamber 312. In such embodiments, the thermal fluid 504 may be suitable for ejection into the infiltration chamber 312, such as a gas (e.g., air, $CO_2$, argon, helium, oxygen, nitrogen, etc.) and there might not be recirculation of the thermal fluid 504.

In some embodiments, a second flow path 802b may be fluidly coupled to and extend laterally from the first flow path 802a at the top of the displacement core 316 and towards the funnel 306. In such embodiments, a structural thermal conduit 502 (denoted by dotted lines) for the thermal fluid 504 or other type of fluid conduit may extend from the top of the displacement core 316 and to the funnel 306. At the funnel 306, the second flow path 802b may route the thermal fluid 504 down through the body of the funnel 306 where it may exit the funnel 306 to the heat exchanger 508b, as indicated. The second flow path 802b may alternatively (or in addition thereto) route the thermal fluid 504 out of the funnel 306 and to the heat exchanger 508c, as also indicated. Further, the second flow path 802b may alternatively (or in addition thereto) route the thermal fluid 504 through the mold 302, along a sixth flow path 802f, to the heat exchanger 508a, as described more below.

In FIG. 8A, a third flow path 802c may be fluidly coupled to and extend vertically from the first flow path 802a and through the binder bowl 308. In such embodiments, a thermal conduit 502 (denoted by dotted lines) or another type of fluid conduit capable of circulating the thermal fluid 504 may extend from the top of the displacement core 316 and through the binder bowl 308. In some embodiments, the third flow path 802c may terminate after passing through the binder bowl 308 and the thermal fluid 504 (e.g., a gas) may be ejected from the third flow path 802c. In other embodiments, a fourth flow path 802d may extend vertically from the third flow path 802c and through the cap 310. Again, a thermal conduit 502 (denoted by dotted lines) or another type of fluid conduit capable of circulating the thermal fluid 504 may be used to extend from the top of the binder bowl 308 and to (or through) the cap 310. After passing through the cap 310, the thermal fluid 504 may exit the fourth flow path 802d and circulate to the heat exchanger 508e, as indicated. Alternatively, the thermal fluid 504 (e.g., a gas) may exit the fourth flow path 802d and be ejected.

Still referring to FIG. 8A, in some embodiments, a fifth flow path 802e may be fluidly coupled to and extend laterally from the third flow path 802c within the binder bowl 308. The fifth flow path 802e may be angularly offset from and otherwise extend between the conduits 326 defined in the binder bowl 308. As a result, the fifth flow path 802e may avoid fluid communication with the conduits 326 and may otherwise allow the thermal fluid 504 to exit the binder bowl 308 laterally at a side location to the heat exchanger 508d, as indicated (denoted by dotted lines). In general, this will be associated with the third flow path 802c when it does not fully penetrate binder bowl 308. In embodiments where the thermal fluid 504 is able to retain sufficient thermal energy, the fifth flow path 802e may alternatively (or in addition) extend down and into the funnel 306 where it may help provide thermal energy to the funnel 306. In the funnel 306 the fifth flow path 802e may, in some embodiments, join the second flow path 802b and exit the funnel 306 at the bottom thereof to the heat exchanger 508b, as indicated. In other embodiments, however, the second and fifth flow paths 802b,e may combine to form a sixth flow path 802f that may extend even further down the height of the mold assembly 800a and into the mold 302. In such embodiments, the sixth flow path 802f may extend along the height of the mold 302 and allow the thermal fluid 504 to exit the mold 302 at the bottom of the mold 302 and to the heat exchanger 508a, as indicated. As noted above, however, the sixth flow path 802f may be an extension of the second flow path 802b individually, in at least one embodiment.

In FIG. 8B, which omits the binder bowl 308, the fourth flow path 802d may extend vertically from the first flow path 802a and through the cap 310. Again, a structural thermal conduit 502 (denoted by dotted lines) for the thermal fluid 504 or other type of fluid conduit may be fluidly coupled to and extend from the top of the displacement core 316 and to (or through) the cap 310. After passing through the cap 310, the thermal fluid 504 may exit the fourth flow path 802d and circulate to the heat exchanger 508d, as indicated. Alternatively, the thermal fluid 504 (e.g., a gas) may exit the fourth flow path 802d and be ejected.

As indicated above, the second flow path 802b may be fluidly coupled to and extend laterally from the first flow path 802a at the top of the displacement core 316 and towards the funnel 306, and the structural thermal conduit 502 (denoted by dotted lines) may extend from the top of the displacement core 316 and to the funnel 306. At the funnel 306, the second flow path 802b may either route the thermal fluid 504 out of the funnel 306 and to the heat exchanger 508c or down through the body of the funnel 306 where it may exit the funnel 306 to the heat exchanger 508b, as indicated. In some cases, the second flow path 802b may alternatively (or in addition thereto) route the thermal fluid 504 through the mold 302, along the sixth flow path 802f to the heat exchanger 508a.

It will be appreciated that the thermal conduits 502 traversing any of the above-described flow paths 802a-f in any of the component parts of the mold assemblies 800a-b may exhibit any design or configuration configured to maximize or otherwise optimize thermal energy transfer between the thermal fluid 504 and the contents 506 within the infiltration chamber. For instance, the thermal conduits 502 may be helically-shaped, like a spring or induction coils, or may define or otherwise provide other types of tortuous passageways to help promote heat transfer, such as those found in many types of heat exchangers. In such embodiments, the thermal conduits 502 may be formed as an integral part of the given component parts of the mold assemblies 800a,b such as by forming them out of multiple pieces and joining them together or by using an additive manufacturing process. Further, the component parts of the mold assemblies 800a,b can be formed by a process such as powder sintering. In this case, at least one displacement member that forms the thermal conduits 502 is positioned in a mold for the sintering process, powder is filled in around the at least one displacement member, the assembly is heated to sinter the mold assembly material, and the displacement members are subsequently removed via a suitable process (e.g., leaching, etching, burn out). In other embodiments, the thermal conduits 502 may alternatively exhibit polygonally-shaped pathways, without departing from the scope of the disclosure.

Moreover, while the mold assemblies 800a,b provide a single inlet from a single pump 510, it is contemplated herein to have multiple inlet locations and, possibly, multiple fluid circuits extending through various component parts of the mold assemblies 800a,b. In such embodiments, certain thermal conduits 502 or sets of thermal conduits 502 may be designed to operate simultaneously with or independent of other thermal conduits 502. Moreover, different types and/or temperatures of thermal fluid 504 may be selectively circulated through specific flow paths 802a-f to help selectively promote directional solidification of the contents 506 within the infiltration chamber 312.

In some embodiments, one or both of the mold assemblies 800a,b may further include insulation materials 804 used to retard heat transfer and otherwise retain thermal energy in desired locations of the mold assemblies 800a,b that may be susceptible to defects created by premature solidification. In some embodiments, as illustrated, the insulation material 804 may be positioned adjacent the metal mandrel 202 and otherwise radially interposing the second flow path 802b (the portion through funnel 306) and the metal mandrel 202. As a result, the thermal energy exhibited by the thermal fluid 504 circulating past the metal mandrel 202 in the thermal conduit 502 along the second flow path 802b may be substantially prevented from thermally communicating with the metal mandrel 202. Moreover, in some embodiments, as also illustrated, insulation material 804 may be positioned on the bottom of the mold 302.

The insulation material 804 may be selected from a variety of insulative materials including, but not limited to, ceramics (e.g., oxides, carbides, borides, nitrides, and silicides that may be crystalline, non-crystalline, or semi-crystalline), insulating metal composites, carbons, nano-composites, foams, any composite thereof, or any combination thereof. The insulation material 804 may be in the form of beads, particulates, flakes, fibers, wools, woven fabrics, bulked fabrics, sheets, bricks, stones, blocks, cast shapes, molded shapes, foams, sprayed insulation, and the like, any hybrid thereof, or any combination thereof. Accordingly, examples of suitable materials that may be used as the insulation material 804 may include, but are not limited to, alumina, ceramics, ceramic fibers, ceramic fabrics, ceramic wools, ceramic beads, ceramic blocks, moldable ceramics, woven ceramics, cast ceramics, fire bricks, carbon fibers, graphite blocks, shaped graphite blocks, nano-composites, fluids in a jacket, metal fabrics, metal foams, metal wools, metal castings, and the like, any composite thereof, or any combination thereof.

In some embodiments, one or both of the mold assemblies 800a,b may further include thermally conductive materials 806 used to help facilitate thermal energy transfer from the mold assemblies 800a,b. In some embodiments, as illustrated, the thermally conductive material 806 may be positioned on the bottom of the mold 302 and otherwise interposing the mold 302 and the thermal heat sink 404 (FIGS. 4B and 4C). Suitable materials for the thermally conductive material 806 include, but are not limited to, a ceramic (e.g., oxides, carbides, borides, nitrides, silicides), a metal (e.g., steel, stainless steel, nickel, tungsten, titanium or alloys thereof), alumina, graphite, and any combination thereof.

Referring now to FIGS. 9A-9D, with continued reference to FIGS. 8A-8B, illustrated are various mating interfaces between adjacent component parts of a given mold assembly, according to one or more embodiments. In each of FIGS. 9A-9D, a thermal conduit 502 is depicted as being arranged or otherwise positioned within fluid flow passages 902, shown as fluid flow passages 902a and 902b. In other embodiments, however, the thermal conduit 502 could be omitted and the fluid flow passages 902a,b may alternatively provide or otherwise define the thermal conduit 502, as briefly mentioned above. The first fluid flow passage 902a may be defined within a first component part 904a, and the second fluid flow passage 902b may be defined within a second component part 904b. Each mating interface may include a first mating surface 906a of the first component part 904a, and a second mating surface 906b of the second component part 904b.

The first and second component parts 904a,b may be any component part of any of the mold assemblies described herein. In at least one embodiment, for instance, the first and second component parts 904a,b may comprise the funnel 306 (FIGS. 3, 5-7, and 8A-8B) and the mold 302 (FIGS. 3, 5-7, and 8A-8B), respectively, and FIGS. 9A-9D may thereby depict various mating interface configurations between the funnel 306 and the mold 302. In other embodiments, the first and second component parts 904a,b may comprise the mold 302 and the thermal heat sink 404 (FIGS. 4A-4B), respectively, and FIGS. 9A-9D may therefore depict various mating interface configurations between those two components.

Figure 9A:
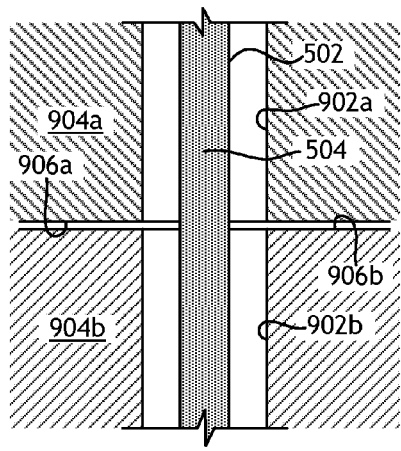
Figure 9B:
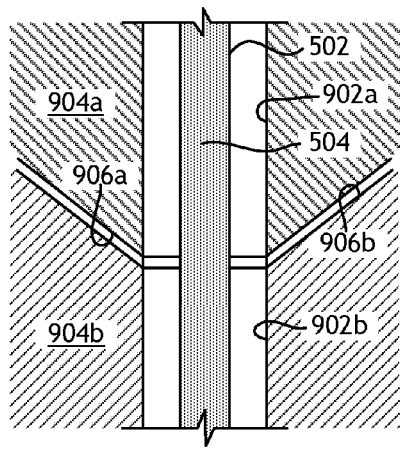

In FIG. 9A, the mating interface provides corresponding flat mating surfaces 906a and 906b. In such an embodiment, the fluid flow passages 902a,b generally align to allow the thermal conduit 502 to bypass and otherwise extend across and through the mating interface. In FIG. 9B, the mating surfaces 906a,b are beveled and/or otherwise complimentarily angled to help align the fluid flow passages 902a and 902b.

Figure 9C:
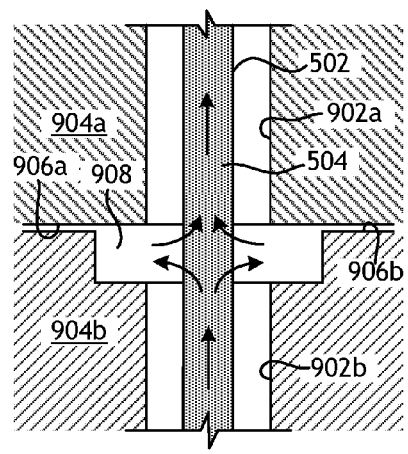

In FIG. 9C, the first mating surface 906a may be generally flat, while the second mating surface 906b may provide or otherwise define an annular channel 908 or reservoir (such as a counterbore). In such embodiments, the thermal conduit 502 may or may not be included or used. When the thermal conduit 502 is omitted, the thermal fluid 504 may be free to flow into the annular channel 908 in either direction from one or both of the fluid flow passages 902a,b. In the illustrated embodiment, the thermal fluid 504 is depicted as flowing through the second component part 904b to the first component part 904a. Upon locating the annular channel 908, the thermal fluid 504 flowing within the second fluid flow passage 902b may be able to escape into the annular channel 908. The thermal fluid 504 may then be able to flow or circulate within the annular channel 908 until locating the first fluid flow passage 902a, at which point the thermal fluid 504 may be able to circulate into the first component part 904b via the first fluid flow passage 902a. As will be appreciated, such an embodiment may prove useful since the fluid flow passages 902a,b need not be precisely aligned for the thermal fluid 504 to bypass the mating interface. Furthermore, such annular channels 908 may be annular with respect to the thermal conduit 502 or with respect to the given component part, such as the mold 302 or the funnel 306. In the latter case, thermal conduits 502 and/or the flow of thermal fluid 504 need not be aligned in the circumferential direction, as the annular channel 908 provides a type of mixing chamber between conduits and/or flow paths.

Figure 9D:
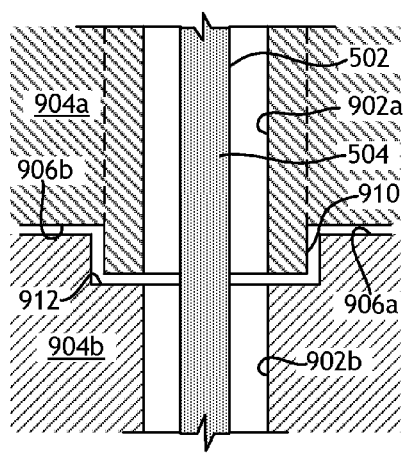

In FIG. 9D, the first mating surface 906a may provide or otherwise define a protrusion 910, and the second mating surface 906b may provide or otherwise define a recess 912 configured to receive the protrusion 910. While the protrusion 910 and the recess 912 are depicted as having generally polygonal features (i.e., squared or angled edges), it will be appreciated that the protrusion 910 and the recess 912 may alternatively be complimentarily circular or exhibit other polygonal shapes, without departing from the scope of the disclosure. In some embodiments, the protrusion 910 and the recess 912 may be localized features defined at one or more discrete locations on the first and second component parts 904a,b, respectively. In such embodiments, mating of the protrusion 910 and the recess 912 may effectively place the first and second fluid flow passages 902a,b in fluid communication and otherwise allow the thermal conduit 502 to extend across the mating interface. In other embodiments, however, the protrusion 910 and the recess 912 may form annular features that extend about a circumference of the first and second component parts 904a,b, respectively. In such embodiments, the thermal conduit 502 may be omitted and the thermal fluid 504 may instead be able to fluidly communicate across the mating interface between the first and second fluid flow passages 902a,b by flowing within the recess 912 until locating a corresponding fluid flow passage 902a,b. Accordingly, in such embodiments, the fluid flow passages 902a,b need not be aligned for the thermal fluid 504 to bypass the mating interface.

Moreover, the mating interface of FIG. 9D may be able to provide a mechanical coupling between the first and second component parts 904a,b. In some embodiments, for instance, inserting the protrusion 910 into the recess 912 may serve to mechanically couple the first and second component parts 904a,b via a snap fit, an interference fit, or a keyed fitting. In other embodiments, the protrusion 910 may be threaded into the recess 912 to mechanically couple the first and second component parts 904a,b. Such a configuration is congruent with the funnel 306 being screwed onto the mold 302 as part of the assembly process. Alternatively, a closed or sealed channel for the thermal fluid 504 may be generated where the outward threading between the two component parts 904a,b may be a separate component (a thermal conduit 502) that slides or threads into an existing component part (see the dotted lines), and thereby allows for complete assembly. In such a configuration, the protrusion 910 may slide through component part 904a and thread directly into recess 912.

It will be appreciated that the various embodiments described and illustrated herein may be combined in any combination, in keeping within the scope of this disclosure. Indeed, variations in the placement, number, and operation of any of the thermal conduits 502 of any of the mold assemblies described herein may be implemented in any of the embodiments and in any combination, without departing from the scope of the disclosure.

Embodiments disclosed herein include:

A. A system for fabricating an infiltrated downhole tool that includes a mold assembly having one or more component parts and defining an infiltration chamber to receive and contain matrix reinforcement materials and a binder material used to form the infiltrated downhole tool, and one or more thermal conduits positioned within the one or more component parts for circulating a thermal fluid through at least one of the one or more component parts and thereby placing the thermal fluid in thermal communication with the infiltration chamber.

B. A method that includes circulating a thermal fluid through one or more thermal conduits positioned within one or more component parts of a mold assembly, the mold assembly defining an infiltration chamber, selectively placing the thermal fluid in thermal communication with contents disposed within the infiltration chamber as the thermal fluid circulates through the one or more thermal conduits, and regulating a thermal profile of the mold assembly with the thermal fluid.

C. A method that includes introducing a drill bit into a wellbore, the drill bit being formed in a mold assembly having one or more component parts and defining an infiltration chamber, wherein forming the drill bit comprises circulating a thermal fluid through one or more thermal conduits positioned within the one or more component parts, selectively placing the thermal fluid in thermal communication with contents disposed within the infiltration chamber as the thermal fluid circulates through the one or more thermal conduits, and regulating a thermal profile of the mold assembly with the thermal fluid, and drilling a portion of the wellbore with the drill bit.

Each of embodiments A, B, and C may have one or more of the following additional elements in any combination: Element 1: wherein the infiltrated downhole tool is selected from the group consisting of a drill bit, a cutting tool, a non-retrievable drilling component, a drill bit body associated with casing drilling of wellbores, a drill-string stabilizer, a cone for a roller-cone drill bit, a model for forging dies used to fabricate support arms for roller-cone drill bits, an arm for a fixed reamer, an arm for an expandable reamer, an internal component associated with expandable reamers, a rotary steering tool, a logging-while-drilling tool, a measurement-while-drilling tool, a side-wall coring tool, a fishing spear, a washover tool, a rotor, a stator, a blade for a downhole turbine, and a housing for a downhole turbine. Element 2: wherein the thermal fluid is a fluid selected from the group consisting of a gas, water, steam, an oil, a coolant, a molten metal, a molten metal alloy, a fluidized bed, a molten salt, and any combination thereof. Element 3: wherein the one or more component parts are selected from the group consisting of a mold, a gauge ring, a funnel, a binder bowl, a cap, a displacement core, and one or more nozzle displacement legs. Element 4: further comprising at least one of a heat exchanger fluidly coupled to the one or more thermal conduits for thermally conditioning the thermal fluid, and a pump fluidly coupled to the heat exchanger and the one or more thermal conduits to circulate the thermal fluid through the one or more component parts. Element 5: wherein the one or more thermal conduits form a spiral or helical array. Element 6: wherein the one or more thermal conduits comprise a plurality of thermal conduits, and wherein one or more of the plurality of thermal conduits are independently operable. Element 7: wherein the one or more component parts include a mold, a first nozzle displacement leg, and a second nozzle displacement leg, and wherein the one or more thermal conduits penetrate the mold at a first location, extend through the first nozzle displacement leg, extend through the second nozzle displacement leg, and penetrate the mold at a second location. Element 8: wherein the one or more component parts include a mold, one or more nozzle displacement legs, and a displacement core, and wherein the one or more thermal conduits penetrate the mold, extend through the first nozzle displacement leg, and extend through the displacement core to eject the thermal fluid into the infiltration chamber. Element 9: wherein the mold assembly includes a metal mandrel positioned within the infiltration chamber, the system further comprising insulation materials interposing the one or more thermal conduits and the metal mandrel. Element 10: wherein the one or more component parts comprise a first component part and a second component part, the first component part defining a first fluid flow passage and a first mating interface, and the second component part defining a second fluid flow passage and a second mating interface. Element 11: wherein the first and second mating interfaces are complimentarily angled to align the first and second fluid flow passages and thereby allow the thermal conduit to bypass the first and second mating interfaces. Element 12: wherein at least one of the first and second mating interfaces defines a channel, and wherein the thermal fluid flows within the channel to locate one of the first and second fluid flow passages and thereby bypass the first and second mating interfaces. Element 13: wherein the first mating surface defines a protrusion and the second mating surface defines a recess that receives the protrusion.

Element 14: wherein the contents include matrix reinforcement materials and a binder material, and wherein selectively placing the thermal fluid in thermal communication with contents comprises heating the matrix reinforcement materials and the binder material and thereby assisting infiltration of the binder material into the matrix reinforcement materials. Element 15: wherein the contents disposed within the infiltration chamber are molten contents and regulating the thermal profile of the mold assembly with the thermal fluid comprises selectively cooling portions of the molten contents with the thermal fluid and thereby facilitating directional solidification of the molten contents. Element 16: wherein selectively cooling portions of the molten contents with the thermal fluid comprises generating a thermal gradient along an axial height of at least a portion of the mold assembly with the thermal fluid. Element 17: wherein the mold assembly includes a metal mandrel positioned within the infiltration chamber, the method further comprising retarding heat transfer between the metal mandrel and the one or more thermal conduits with insulation materials interposing the metal mandrel and the one or more thermal conduits.

By way of non-limiting example, exemplary combinations applicable to A, B, and C include: Element 10 with Element 11; Element 10 with Element 12; Element 10 with Element 13; and Element 15 with Element 16.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A system for fabricating an infiltrated downhole tool, comprising:
   a mold assembly having one or more component parts and defining an infiltration chamber to receive and contain matrix reinforcement materials and a binder material used to form the infiltrated downhole tool; and
   one or more thermal conduits positioned within the one or more component parts for circulating a thermal fluid through at least one of the one or more component parts and thereby placing the thermal fluid in thermal communication with the infiltration chamber;
   wherein the mold assembly includes a metal mandrel positioned within the infiltration chamber, the system further comprising insulation materials interposing the one or more thermal conduits and the metal mandrel.

2. The system of claim 1, wherein the infiltrated downhole tool is selected from the group consisting of a drill bit, a cutting tool, a non-retrievable drilling component, a drill bit body associated with casing drilling of wellbores, a drill-string stabilizer, a cone for a roller-cone drill bit, a model for forging dies used to fabricate support arms for roller-cone drill bits, an arm for a fixed reamer, an arm for an expandable reamer, an internal component associated with expandable reamers, a rotary steering tool, a logging-while-drilling tool, a measurement-while-drilling tool, a side-wall coring tool, a fishing spear, a washover tool, a rotor, a stator, a blade for a downhole turbine, and a housing for a downhole turbine.

3. The system of claim 1, wherein the thermal fluid is a fluid selected from the group consisting of a gas, water, steam, an oil, a coolant, a molten metal, a molten metal alloy, a fluidized bed, a molten salt, and any combination thereof.

4. The system of claim 1, wherein the one or more component parts are selected from the group consisting of a mold, a gauge ring, a funnel, a binder bowl, a cap, a displacement core, and one or more nozzle displacement legs.

5. The system of claim 1, further comprising at least one of:
   a heat exchanger fluidly coupled to the one or more thermal conduits for thermally conditioning the thermal fluid; and
   a pump fluidly coupled to the heat exchanger and the one or more thermal conduits to circulate the thermal fluid through the one or more component parts.

6. The system of claim 1, wherein the one or more thermal conduits form a spiral or helical array.

7. The system of claim 1, wherein the one or more thermal conduits comprise a plurality of thermal conduits, and wherein one or more of the plurality of thermal conduits are independently operable.

8. The system of claim 1, wherein the one or more component parts include a mold, a first nozzle displacement leg, and a second nozzle displacement leg, and wherein the one or more thermal conduits penetrate the mold at a first location, extend through the first nozzle displacement leg, extend through the second nozzle displacement leg, and penetrate the mold at a second location.

9. The system of claim 8, wherein the one or more component parts include a mold, one or more nozzle displacement legs, and a displacement core, and wherein the one or more thermal conduits penetrate the mold, extend through the first nozzle displacement leg, and extend through the displacement core to eject the thermal fluid into the infiltration chamber.

10. The system of claim 1, wherein the one or more component parts comprise a first component part and a second component part, the first component part defining a first fluid flow passage and a first mating interface, and the second component part defining a second fluid flow passage and a second mating interface.

11. The system of claim 10, wherein the first mating interface defines a protrusion and the second mating interface defines a recess that receives the protrusion.

12. A system for fabricating an infiltrated downhole tool, comprising:
a mold assembly having one or more component parts and defining an infiltration chamber to receive and contain matrix reinforcement materials and a binder material used to form the infiltrated downhole tool; and
one or more thermal conduits positioned within the one or more component parts for circulating a thermal fluid through at least one of the one or more component parts and thereby placing the thermal fluid in thermal communication with the infiltration chamber;
wherein the one or more component parts comprise a first component part and a second component part, the first component part defining a first fluid flow passage and a first mating interface, and the second component part defining a second fluid flow passage and a second mating interface;
wherein the first and second mating interfaces are complimentarily angled to align the first and second fluid flow passages and thereby allow the thermal conduit to pass the first and second mating interfaces.

13. The system of claim 12, wherein the mold assembly includes a metal mandrel positioned within the infiltration chamber, the system further comprising insulation materials interposing the one or more thermal conduits and the metal mandrel.

14. The system of claim 12, wherein the one or more thermal conduits comprise a plurality of thermal conduits, and wherein one or more of the plurality of thermal conduits are independently operable.

15. The system of claim 12, wherein the one or more component parts include a mold, a first nozzle displacement leg, and a second nozzle displacement leg, and wherein the one or more thermal conduits penetrate the mold at a first location, extend through the first nozzle displacement leg, extend through the second nozzle displacement leg, and penetrate the mold at a second location.

16. A system for fabricating an infiltrated downhole tool, comprising:
a mold assembly having one or more component parts and defining an infiltration chamber to receive and contain matrix reinforcement materials and a binder material used to form the infiltrated downhole tool; and
one or more thermal conduits positioned within the one or more component parts for circulating a thermal fluid through at least one of the one or more component parts and thereby placing the thermal fluid in thermal communication with the infiltration chamber;
wherein the one or more component parts comprise a first component part and a second component part, the first component part defining a first fluid flow passage and a first mating interface, and the second component part defining a second fluid flow passage and a second mating interface;
wherein at least one of the first and second mating interfaces defines a channel, and wherein the thermal fluid flows within the channel to locate one of the first and second fluid flow passages and thereby pass the first and second mating interfaces.

17. The system of claim 16, wherein the mold assembly includes a metal mandrel positioned within the infiltration chamber, the system further comprising insulation materials interposing the one or more thermal conduits and the metal mandrel.

18. The system of claim 16, wherein the one or more thermal conduits comprise a plurality of thermal conduits, and wherein one or more of the plurality of thermal conduits are independently operable.

19. The system of claim 16, wherein the one or more component parts include a mold, a first nozzle displacement leg, and a second nozzle displacement leg, and wherein the one or more thermal conduits penetrate the mold at a first location, extend through the first nozzle displacement leg, extend through the second nozzle displacement leg, and penetrate the mold at a second location.

* * * * *